(12) United States Patent
Hessling-von Heimendahl et al.

(10) Patent No.: US 11,691,758 B2
(45) Date of Patent: Jul. 4, 2023

(54) AIRCRAFT BEACON LIGHT, AIRCRAFT COMPRISING AN AIRCRAFT BEACON LIGHT, AND METHOD OF DETERMINING A HEALTH STATUS OF AN AIRCRAFT BEACON LIGHT

(71) Applicant: Goodrich Lighting Systems GmbH & Co. KG, Lippstadt (DE)

(72) Inventors: Andre Hessling-von Heimendahl, Koblenz (DE); Robert Trinschek, Hamm (DE); Marion Depta, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/729,148

(22) Filed: Apr. 26, 2022

(65) Prior Publication Data
US 2022/0348354 A1     Nov. 3, 2022

(30) Foreign Application Priority Data

Apr. 29, 2021   (EP) .................................... 21171342

(51) Int. Cl.
| | |
|---|---|
| *B64D 47/06* | (2006.01) |
| *B60Q 1/00* | (2006.01) |
| *B60Q 11/00* | (2006.01) |
| *F21S 43/31* | (2018.01) |
| *H05B 45/50* | (2022.01) |
| *H05B 47/20* | (2020.01) |
| *F21Y 115/10* | (2016.01) |

(52) U.S. Cl.
CPC .......... *B64D 47/06* (2013.01); *B60Q 1/0023* (2013.01); *B60Q 11/005* (2013.01); *F21S 43/31* (2018.01); *H05B 45/50* (2020.01); *H05B 47/20* (2020.01); *B64D 2203/00* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 8,773,044 B2 | 7/2014 | Hessling | |
| 10,151,708 B2 | 12/2018 | Hessling-Von Heimendahl et al. | |
| 10,299,343 B2 | 5/2019 | Klein et al. | |
| 11,006,500 B1 * | 5/2021 | Edquist | F21S 43/40 |
| 2016/0347474 A1 * | 12/2016 | Millet | F21V 7/24 |

FOREIGN PATENT DOCUMENTS

| | | | |
|---|---|---|---|
| EP | 3812285 A1 | 4/2021 | |
| EP | 3812286 A1 | 4/2021 | |
| WO | WO-0027699 A2 * | 5/2000 | B60Q 1/2611 |
| WO | 0027699 | 5/2020 | |

OTHER PUBLICATIONS

European Search Report for Application No. 21171342.5, dated Oct. 22, 2021, 7 pages.

* cited by examiner

*Primary Examiner* — Anh Q Tran
(74) *Attorney, Agent, or Firm* — Cantor Colburn LLP

(57) ABSTRACT

An aircraft beacon light with integrated health monitoring comprises an annular arrangement of light sources, which are configured for repeatedly emitting beacon light flashes; a light detection sensor surrounded by the annular arrangement of light sources; and at least one reflective portion arranged to reflect light emitted by the annular arrangement of light sources onto the light detection sensor.

15 Claims, 7 Drawing Sheets

AIRCRAFT BEACON LIGHT, AIRCRAFT COMPRISING AN AIRCRAFT BEACON LIGHT, AND METHOD OF DETERMINING A HEALTH STATUS OF AN AIRCRAFT BEACON LIGHT

CROSS REFERENCE TO RELATED APPLICATIONS

This application claims priority to European Patent Application No. 21171342.5 filed Apr. 29, 2021, the entire contents of which is incorporated herein by reference.

FIELD

The present invention is in the field of exterior aircraft lights. The present invention is in particular related to an aircraft beacon light, to an aircraft comprising such an aircraft beacon light, and to a method of determining a health status of an aircraft beacon light.

BACKGROUND

Almost all aircraft have exterior aircraft lights. In particular, large passenger air planes are equipped with a wide variety of exterior aircraft lights. Examples of such exterior aircraft lights include take-off and/or landing lights, taxi lights, navigation lights and anti-collision lights.

The term "anti-collision light" is a generic term, which encompasses white flashing strobe lights, typically mounted at the wing tips and the tail of an aircraft, and red flashing aircraft beacon lights, usually mounted above and below the fuselage of an aircraft.

Aircraft beacon lights typically comprise a large number of light sources aiming in different directions for generating a circumferential light distribution. Any failure of light sources leaves a gap in the circumferential light distribution emitted by the aircraft beacon light. As a result, the aircraft beacon light may no longer comply with aircraft safety regulations. The emission characteristics of red LEDs, which are often employed as light sources in aircraft beacon lights, are highly dependent on ambient temperatures and aging. Thus, it is desirable to closely monitor the light emission of the light sources of aircraft beacon lights.

Further, the outer light transmissive cover of aircraft beacon lights is susceptible to erosion. Erosion of the light transmissive cover may spread/diffuse the light to such an extent that minimum light intensities, as required by aircraft safety regulations, are no longer achieved. Thus, it is desirable to also monitor the erosion of the light transmissive cover of an aircraft beacon light.

Accordingly, it would be beneficial to provide an aircraft beacon light and a method of determining a health status of an aircraft beacon light, which allow for reliably monitoring the operation of an aircraft beacon light.

SUMMARY

Exemplary embodiments of the invention include an aircraft beacon light comprising an annular arrangement of light sources which are configured for repeatedly emitting beacon light flashes; a light detection sensor surrounded by the annular arrangement of light sources; and at least one reflective portion arranged for reflecting light emitted by the annular arrangement of light sources onto the light sensor.

Exemplary embodiments of the invention further include a method of determining a health status of an aircraft beacon light, wherein the aircraft beacon light comprises an annular arrangement of light sources and a light detection sensor surrounded by the annular arrangement of light sources, and wherein the method includes: repeatedly emitting beacon light flashes from the annular arrangement of light sources; generating sensor measurement outputs with the light detection sensor, the sensor measurement outputs being indicative of light emitted by the annular arrangement of light sources and reflected onto the light detection sensor by at least one reflective portion; and determining a health status of the aircraft beacon light from the sensor measurement outputs.

In an aircraft beacon light according to an exemplary embodiment of the invention and in a method according to an exemplary embodiment of the invention, a single light detection sensor may suffice for monitoring the operation of all light sources and the erosion of the light transmissive cover. Since only a single light detection sensor is employed for monitoring the operation of a large number of light sources, as are usually employed in an aircraft beacon light, an aircraft beacon light according to an exemplary embodiment of the invention may be provided at comparatively low costs. According to other approaches, which rely on a plurality of light sensors for detecting light emitted by the plurality of light sources in different spatial directions and light reflected by different eroded portions of the outer cover of an aircraft beacon light, the monitoring of the aircraft beacon light may be achieved at reduced complexity and cost.

According to an embodiment, the aircraft beacon light further comprises a light transmissive cover, covering and protecting the annular arrangement of light sources and the light detection sensor.

According to an embodiment, a cavity is formed between the light transmissive cover and the outer periphery of the aircraft, and the light sources and the light detection sensor are arranged within said cavity.

According to an embodiment, the at least one reflective portion is a separate component, i.e. a component which is provided separately from the light transmissive cover, and the at least one reflective portion is arranged within the cavity defined by the light transmissive cover and the outer periphery of the aircraft. The separate component forming the at least one reflective portion may be supported by the light transmissive cover and/or it may be supported by an additional support structure provided within the cavity.

According to an embodiment, the at least one reflective portion is supported by the light transmissive cover. In such a configuration, no additional support structure needs to be provided.

According to an embodiment, the at least one reflective portion is formed integrally with the light transmissive cover. By integrating the at least one reflective portion with the light transmissive cover, the number of components and, thus, the cost for manufacturing the aircraft beacon light may be kept particularly low.

According to an embodiment, the at least one reflective portion comprises a reflective paint or coating, in particular a diffusely reflective paint or coating. The at least one reflective portion or part of the at least one reflective portion may be formed by said reflective paint or coating. The reflective paint or coating may in particular be applied to at least a portion of the light transmissive cover. Using a reflective paint or coating for forming at least part of the at least one reflective portion may provide for a comparably simple and cost efficient way of implementing a reflective portion. The diffusely reflective paint or coating may for example be a white paint or coating.

According to an embodiment, the at least one reflective portion includes a specular reflecting portion and/or a diffusely reflecting portion. Depending on the specific implementation of the aircraft beacon light, specular reflection or diffuse reflection may be beneficial for achieving an optimized trade-off between quality of evaluation results and complexity of implementation.

According to an embodiment, the at least one reflective portion includes a substantially planar portion. Additionally or alternatively, the at least one reflective portion may include a curved portion, in particular a curved portion having an ellipsoidal shape.

Depending on the geometry of the aircraft beacon light, in particular the shape of the light transmissive cover, the at least one reflective portion may comprise at least one planar portion or at least one curved portion, or a combination thereof, in order to provide reflection properties that are beneficial for achieving reliable evaluation results.

For enhancing the operating conditions of the light detection sensor, the light detection sensor and at least one of the light sources may be arranged in such a way that a portion of the light, emitted by the at least one light source, is focused at the position the light detection sensor.

According to an embodiment, the light sources are arranged in a circular or ellipsoidal configuration, allowing the light sources to emit light in all spatial directions, i.e. into a set of directions which, when projected onto a horizontal plane, completely surround the aircraft beacon light. In other words, the light sources may be arranged to provide a 360° light output around the aircraft beacon light.

According to an embodiment, the light sources are arranged in a rectangular, hexagonal or octagonal configuration, allowing the light sources to emit light in four, six or eight spatial sectors, extending along four, six or eight spatial directions, respectively. The opening angles of the spatial sectors may be set so that the spatial sectors, in combination, cover all spatial directions; i.e. the combination of all spatial sectors, when projected onto a horizontal plane, may cover a full circle of 360° around the aircraft beacon light, so that light is emitted in all spatial directions. Configurations emitting light in different numbers of spatial sectors are possible as well.

According to an embodiment, the annular arrangement of light sources comprises at least two subsets of light sources. Each subset comprises at least one light source, respectively, and the light sources of different subsets are switchable independently of each other.

According to an embodiment, the aircraft beacon light comprises a controller, which is configured for selecting one subset of light sources after the other from the at least two subsets of light sources and modifying the length of at least one of the beacon light flashes emitted by the selected subset of light sources and/or modifying the lengths of the beacon light flashes emitted by the non-selected subset(s) of light sources, so that the length of the at least one beacon light flash emitted by the selected subset of light sources exceeds the lengths of the beacon light flashes emitted by the non-selected subset(s) of light sources by a predetermined extension time period and only the selected subset of light sources is active during the predetermined extension time period.

The controller is further configured for evaluating sensor measurement outputs, which are provided by the light detection sensor during the predetermined extension time periods, for determining a health status of the aircraft beacon light.

According to an embodiment, the annular arrangement of light sources comprises at least two subsets of light sources, each subset comprising at least one light source, respectively, and the method of determining a health status of an aircraft beacon light comprises: selecting one subset of light sources after the other from the at least two subsets of light sources and modifying the length of at least one of the beacon light flashes emitted by the selected subset of light sources and/or modifying the lengths of the beacon light flashes emitted by the non-selected subset(s) of light sources, so that the length of the at least one beacon light flash emitted by the selected subset of light sources exceeds the lengths of the beacon light flashes emitted by the non-selected subset(s) of light sources by a predetermined extension time period and only the selected subset of light sources is active during the predetermined extension time period. The method further comprises evaluating the sensor measurement outputs of the light detection sensor during the predetermined extension time periods for determining the health status of the aircraft beacon light.

Modifying the length of at least one of the beacon light flashes may include extending the length of at least one of the light flashes emitted by the light source(s) of the selected subset and/or shortening the lengths of the beacon light flashes emitted by the light source(s) of the non-selected subset(s).

Such an aircraft beacon light and such a method of determining a health status of an aircraft beacon light may allow for individually evaluating the sensor measurement outputs corresponding to light which is emitted by the different subsets of light sources with only a single light detection sensor. An aircraft beacon light and a method according to exemplary embodiments of the invention may in particular allows for individually determining aging of the light sources of the different subsets of light sources and/or for individually evaluating light which is emitted by different subsets of light sources and reflected by different portions of the light transmissive cover. In consequence, erosion of different portions of the light transmissive cover may be individually determined at low costs, since only a single light detection sensor may be employed.

The selecting of one subset of light sources after the other may be carried out in a cyclic manner and may result in multiple sensor measurement outputs per subset. In this way, a broader data basis and a highly reliable determining of the health status may be achieved. It is also possible that every subset is evaluated only once during a particular health status determining operation.

The subsets of light sources may comprise one light source or a plurality of light sources, respectively. In this way, an individual evaluation of light sources of a group-wise evaluation of light sources may be carried out. Depending on the aircraft beacon light involved, the desired evaluation complexity, and the desired length of the health status determining operation, the number of light sources per subset may be set.

According to an embodiment, determining the health status of the aircraft beacon light includes detecting erosion of the light transmissive cover and/or detecting aging of the light sources. In particular, the determining of the health status of the aircraft beacon light may include distinguishing between erosion of the light transmissive cover and aging of the light sources. Distinguishing between erosion of the light transmissive cover and aging of the light sources may be beneficial for maintenance as it allows for determining in advance, i.e. without a mechanic inspection of the aircraft beacon light, whether light sources and/or the light transmissive cover need to be replaced. As a result, the parts necessary for replacement may be delivered in advance to the site of maintenance and the time needed for maintenance may be reduced.

According to an embodiment, the light sources of the at least two subsets of light sources are configured for providing light emission in different spatial directions.

According to an embodiment, the at least two subsets of light sources include a first subset of light sources, which is configured for providing forward light emission, and a second subset of light sources, which is configured for providing non-forward light emission. The second subset of light sources may in particular be configured for providing rearward light emission.

According to an embodiment, the at least two subsets of light sources further include at least one further subset of light sources, providing lateral light emission.

Providing different subsets of light sources, which are configured for providing light emission in different spatial directions, may allow for individually evaluating the light emitted in the different spatial directions. It may further allow for individually evaluating different portions of the light transmissive cover, passing the light emitted in the different spatial directions, respectively. It may in particular allow for individually evaluating a front portion of the light transmissive cover, passing the light of the forward light emission, which usually is more prone to erosion than the lateral and rear portions of the light transmissive cover, passing the light of the non-forward light emissions.

According to an embodiment, evaluating the sensor measurement outputs includes comparing the sensor measurement outputs caused by light emitted by the at least two different subsets of light sources with each other. Since erosion predominantly occurs at the front side of the light transmissive cover, facing into the direction of flight, comparing the sensor measurement outputs caused by light emitted by a subset of light sources, which is configured for providing forward light emission, with sensor measurement outputs caused by light emitted by at least one subset of light sources, which is configured for providing non-forward light emission, may allow for determining erosion of the light transmissive cover.

According to an embodiment, evaluating the sensor measurement outputs includes storing the sensor measurement outputs in a memory and evaluating a change of the sensor measurement outputs over time.

Evaluating a change of the sensor measurement outputs over time may allow for detecting erosion of the light transmissive cover and/or detecting aging of the light sources from a gradual change of the sensor measurement outputs provided by the light detection sensor over time. In particular, a slow increase of the sensor measurement outputs detected when the forward oriented light sources are activated may be a clear indication for erosion. A gradual decrease of the sensor measurement outputs, in particular a gradual decrease of the sensor measurement outputs associated with multiple of all of the subsets, may be a good indication for aging of the light sources.

According to an embodiment, each beacon light flash has a length of between 90 ms and 110 ms, in particular a length of between 95 ms and 97 ms. According to an embodiment, the predetermined extension time period has a length of between 1 ms and 8 ms, in particular a length of between 2 ms and 5 ms. Such time frames are in agreement with aircraft safety regulations and may allow for reliably evaluating the light detection sensor output caused by light emitted by the light sources of a single subset of light sources during the additional extension time period.

According to an embodiment, the aircraft beacon light includes at least two switchable bypass circuits, each switchable bypass circuit allowing for individually bypassing one of the at least two subsets of light sources, respectively. An aircraft beacon light including switchable bypass circuits may allow for individually adjusting the lengths of the light flashes, emitted by the different subsets of light sources, without modifying the external power supply controlling the operation of the aircraft beacon light. In consequence, an aircraft beacon light comprising multiple switchable bypass circuits, which allow for individually and selectively bypassing the subsets of light sources, may be connected to a conventional aircraft beacon power supply. This may allow for an easy and convenient replacement of a conventional aircraft beacon light by an aircraft beacon light according to an exemplary embodiment of the invention.

According to an embodiment, the light sources are configured for emitting red light, in particular aviation red light, as it is usually emitted by aircraft beacon lights. Alternatively or additionally, the light transmissive cover may be transmissive for red light only, e.g. the light transmissive cover may be a red light filter. It may also be said that the aircraft beacon light is configured to emit red beacon light flashes, in particular aviation red beacon light flashes, in operation.

According to an embodiment, the light sources are or include LEDs. LEDs provide efficient and reliable light sources at comparatively low costs.

According to an embodiment, the method of determining a health status of an aircraft beacon light includes detecting an intensity of ambient light and evaluating the sensor measurement outputs only when the detected intensity of ambient light does not exceed a predetermined threshold.

Evaluating the sensor measurement outputs only when the detected intensity of ambient light does not exceed a predetermined threshold prevents the evaluation results from being affected by ambient light, such as bright daylight, thereby enhancing the quality and reliability of the evaluation results.

According to an embodiment, the light detection sensor is configured for detecting an intensity of ambient light and the controller is configured for evaluating the sensor measurement outputs only when the detected intensity of ambient light does not exceed a predetermined threshold.

According to an embodiment, the aircraft beacon light comprises a separate ambient light sensor for detecting an intensity of ambient light and the controller is configured for evaluating the sensor measurement outputs only when the detected intensity of ambient light does not exceed a predetermined threshold. Such a configuration may enhance the quality and reliability of the evaluation results, as it prevents the evaluation results from being affected by ambient light. A separate ambient light sensor may be arranged at a different position than the light detection sensor, in particular at a position which is more suitable for detecting ambient light without being affected by light emitted by the light sources of the aircraft beacon light.

Exemplary embodiments of the invention further include an aircraft comprising at least one aircraft beacon light according to an exemplary embodiment of the invention. The aircraft may be an air plane or a rotorcraft. The aircraft may in particular comprise a first aircraft beacon light, which is arranged on a top portion of the aircraft, in particular on a top portion of the fuselage of the aircraft, and a second aircraft beacon light, which is arranged on a bottom portion of the aircraft, in particular on a bottom portion of the fuselage of the aircraft.

BRIEF DESCRIPTION OF THE DRAWINGS

Further exemplary embodiments of the invention are described below with respect to the accompanying drawings, wherein.

DETAILED DESCRIPTION

Figure 1:
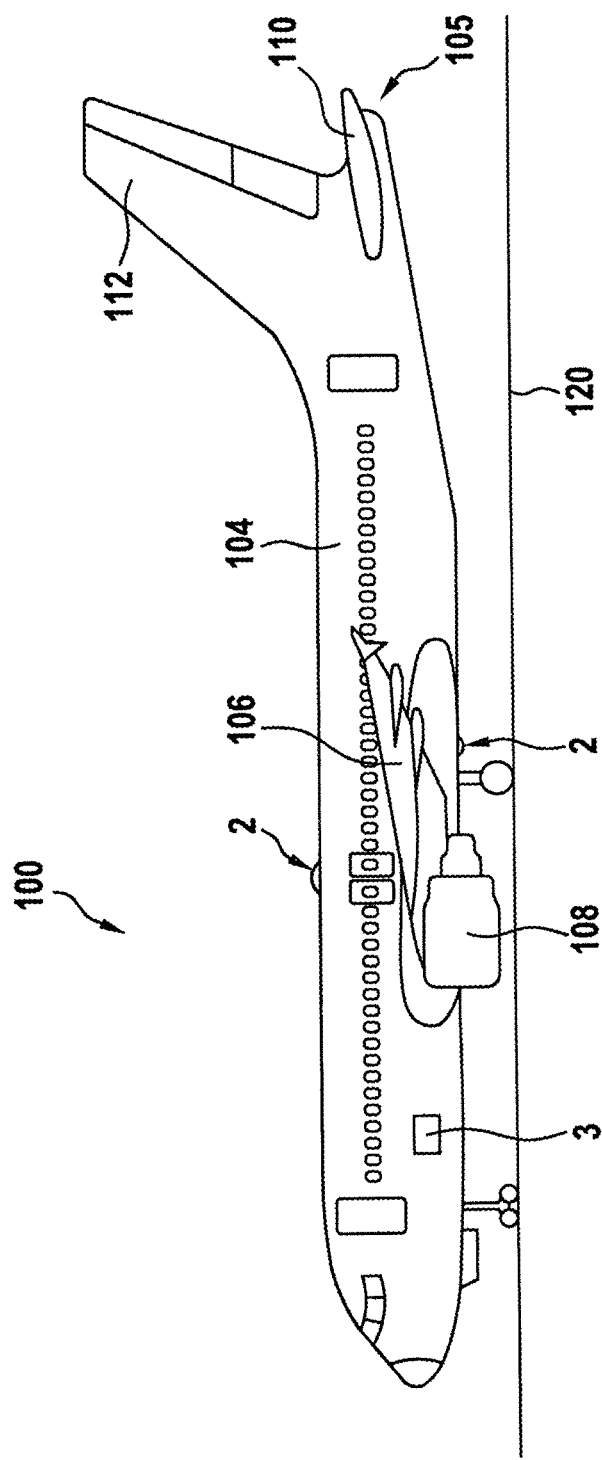
FIG. 1 depicts a schematic side view of an air plane in accordance with an exemplary embodiment of the invention, which is equipped with two aircraft beacon lights according to exemplary embodiments of the invention.

FIG. 1 depicts a schematic side view of an aircraft 100 in accordance with an exemplary embodiment of the invention, which is equipped with two aircraft beacon lights 2 according to exemplary embodiments of the invention.

The aircraft 100 has a fuselage 104 and two wings 106, which are attached to the right and left sides of the fuselage 104. Each of the wings 106 carries an engine 108. Further, two horizontal stabilizers 110 and a vertical stabilizer 112 are mounted to a tail portion of the fuselage 104. In the schematic side view depicted in FIG. 1, only one of the two wings 106, the two engines 108 and the two horizontal stabilizers 110 is visible, respectively. It is pointed out that aircraft in accordance with other designs and constructions are encompassed by exemplary embodiments of the present invention as well.

The aircraft 100 further comprises two aircraft beacon lights 2, mounted to the fuselage 104. An upper aircraft beacon light 2 is mounted to a top portion (roof) of the fuselage 104. A lower aircraft beacon light 2 is mounted to a bottom portion (belly) of the fuselage 104. The aircraft 100 also comprises an aircraft power supply 3 for supplying electric power to electric consumers with in the aircraft 100, in particular to the aircraft beacon lights 2

The aircraft 100 shown in FIG. 1 is an air plane 100, in particular a large passenger or cargo air plane 100. It is pointed out that other types of aircraft, such as smaller air planes 100, may be equipped with aircraft beacon lights 2 in accordance with exemplary embodiments of the invention as well.

Figure 2:
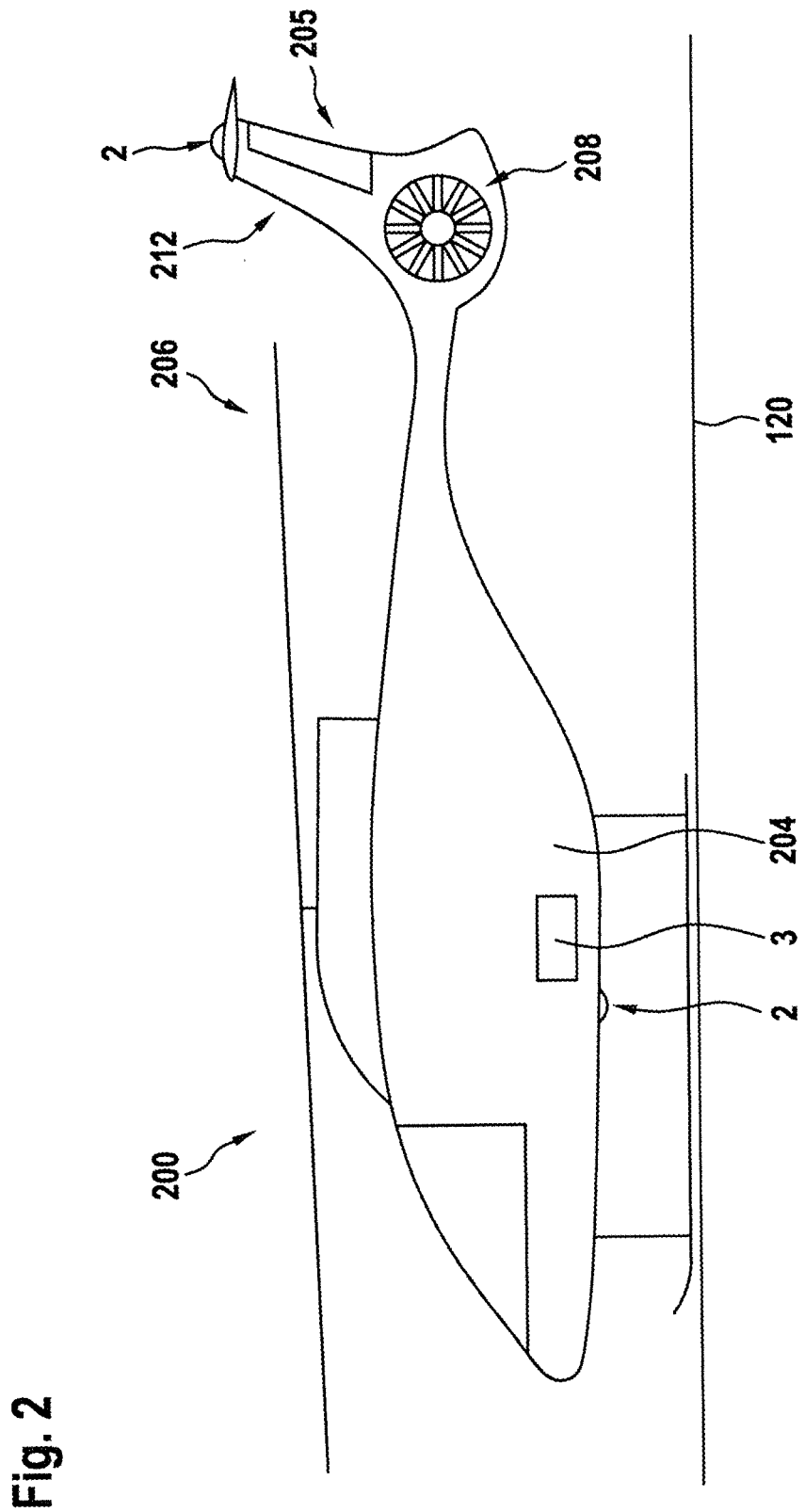
FIG. 2 depicts a schematic side view of a rotorcraft in accordance with an exemplary embodiment of the invention, which is equipped with two aircraft beacon lights according to exemplary embodiments of the invention.

FIG. 2 shows a schematic side view of another aircraft 200, in particular of a rotorcraft (helicopter) 200, having a fuselage 204 and two rotors 206, 208.

A lower aircraft beacon light 2 according to an exemplary embodiment of the invention is mounted to a bottom portion (belly) of the fuselage 204. An upper aircraft beacon light 2 is mounted to the top of a vertical stabilizer 212 at the tail 205 of the rotorcraft 200. The aircraft 200 also comprises an aircraft power supply 3 for supplying electric power to electric consumers with in the aircraft 200, in particular to the aircraft beacon lights 2.

For both the FIG. 1 and FIG. 2 embodiments, the upper and lower aircraft beacon lights 2 are configured for emitting light flashes of red light in operation, in order to provide a beacon light behavior, as it is expected by other aircraft, ground personnel and air space control. The aircraft beacon lights 2 may in particular emit light flashes of aviation red light, with the light flashes of aviation red light indicating that the engines 108 of the aircraft 100 are running.

Although only two aircraft beacon lights 2 are shown in FIGS. 1 and 2, respectively, an aircraft 100, 200 may comprise more than two aircraft beacon lights 2. An aircraft 100, 200 may in particular comprise various combinations of aircraft beacon lights, and at least some of the aircraft beacon lights may be mounted to the wings 106 and/or to the stabilizers 110, 112, 212 and/or to the tail 105, 205 of the aircraft 100, 200. Not all aircraft beacon lights 2 of the aircraft 100 need to be aircraft beacon lights 2 according to exemplary embodiments of the invention.

The upper and lower aircraft beacon lights 2, depicted in FIGS. 1 and 2, are formed in accordance with exemplary embodiments of the invention, the details of which will be described in the following.

Figure 3:
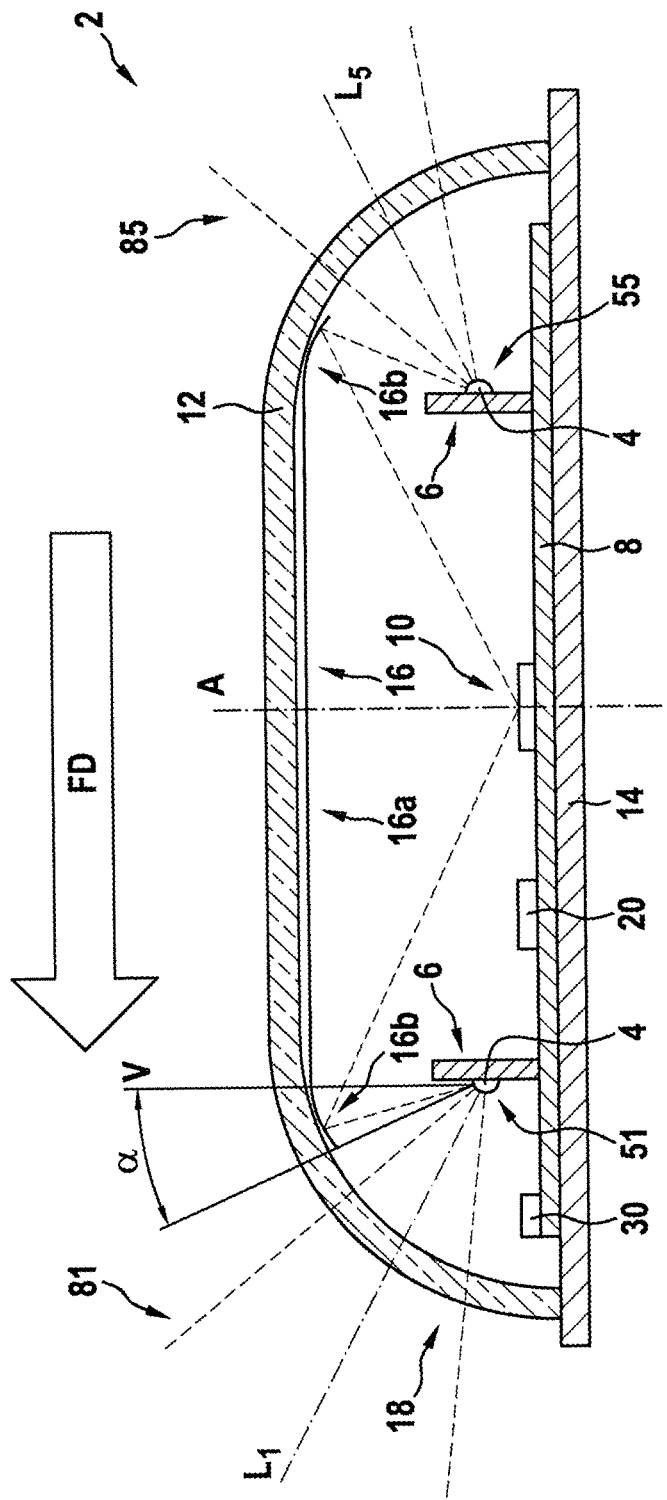
FIG. 3 depicts a cross-sectional view of an aircraft beacon light according to an exemplary embodiment of the invention
Figure 4:
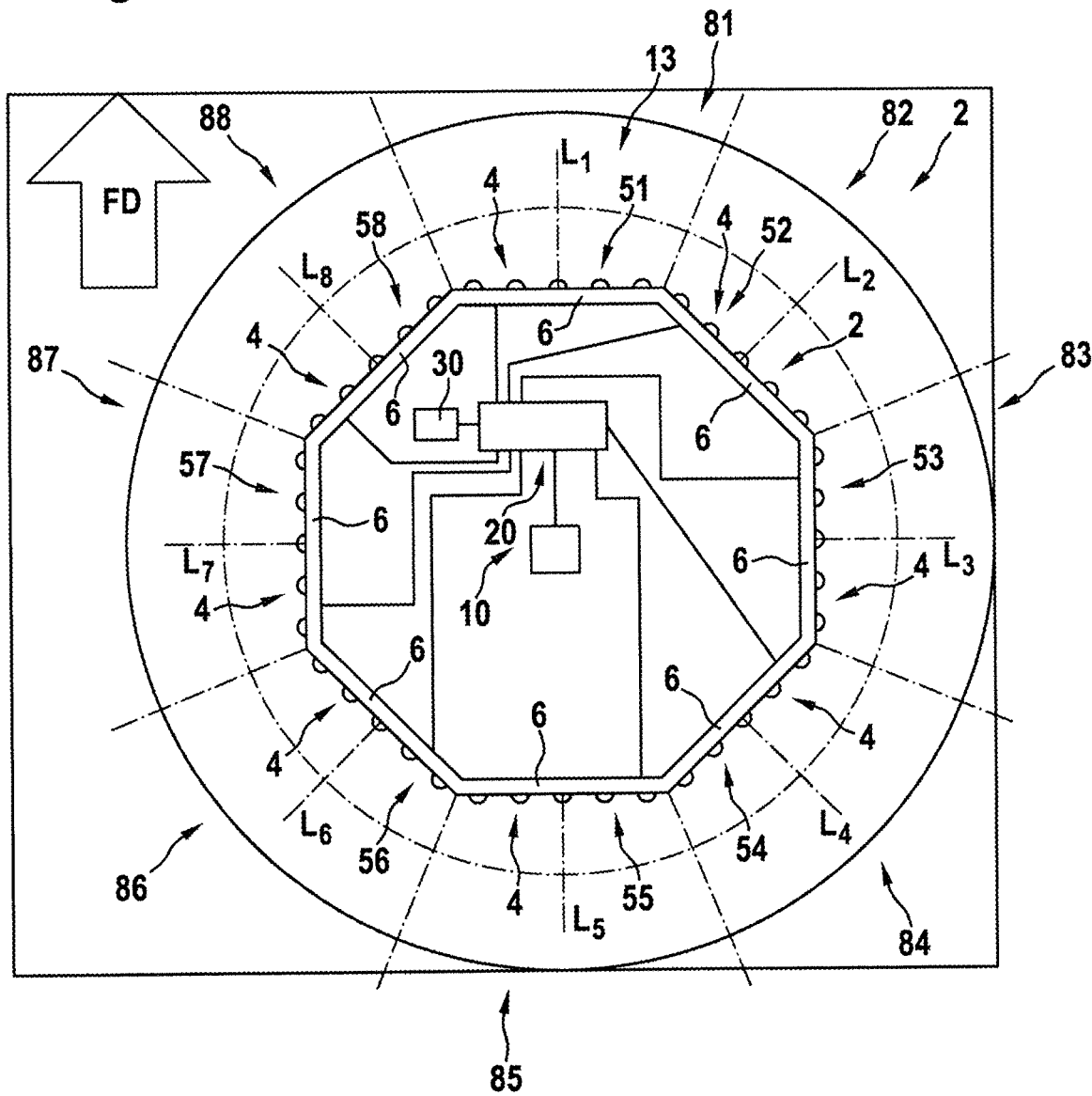
FIG. 4 depicts a top view of the aircraft beacon light depicted in FIG. 3.

FIG. 3 depicts a cross-sectional view of an aircraft beacon light 2 according to an exemplary embodiment of the invention, and FIG. 4 depicts a top view thereof. In particular, FIG. 3 depicts a vertical cross-sectional view through a center of the aircraft beacon light 2, with the cross-sectional plane extending along the longitudinal direction of the aircraft, when the aircraft beacon light 2 is mounted to the aircraft.

The aircraft beacon light 2 comprises a plurality of light sources 4 for repeatedly emitting beacon light flashes. The light sources 4 are in particular configured for emitting red light. The light sources 4 may be or may include LEDs.

The light sources 4 are mounted to light source supports 6 extending from a ground plate 8. The ground plate 8 may be a circuit board, in particular a printed circuit board (PCB). The light sources 4 and the light source supports 6 are arranged in an angular configuration (see FIG. 4) for emitting light in all spatial directions, in particular for emitting light into a set of directions which, when projected onto a horizontal plane, covers an angle of 360° around the aircraft beacon light 2.

In the exemplary embodiment depicted in FIG. 4, the aircraft beacon light 2 comprises eight planar light source supports 6, which are arranged in an octagonal configuration. In the schematic illustration shown in FIG. 4, each light source support 6 supports five light sources 4, respectively. Every light source support 6, however, may support a different number, in particular a larger number, of light sources 4, respectively. The total number of light sources 4 of the aircraft beacon light 2 may in particular exceed the number of fifty light sources 4.

The plurality of light sources 4 mounted to a common light source support 6 form one of eight subsets 51-58 of light sources 4, respectively. The lights sources 4 of each subset 51-58 generate a light emission 81-88 around a common light emission direction L1-L8. Each light emission direction L1-L8 is oriented substantially orthogonal to the plane of the corresponding light source support 6.

The octagonal arrangement of the light source supports 6, depicted in FIG. 4, is only exemplary. An aircraft beacon light 2 according to exemplary embodiments of the invention may in particular comprise more or less than eight light source supports 6.

In alternative configurations, which are not shown in the figures, the aircraft beacon light 2 may, for example, comprise four light source supports 6 arranged in a rectangular configuration, or six light source supports 6 arranged in a hexagonal configuration. It is also possible that the light sources are arranged along one or more curved light source support(s), in particular arranged along a cylindrical light source support. It is also possible that the light sources are arranged on the ground plate and that portions of their light output is directed laterally outwards by suitable optical element(s).

The light source supports 6 may be formed separately from each other. Alternatively, the light source supports 6 may be formed integrally with each other, forming a single light source support 6 comprising a plurality of planar light source support portions facing in different spatial directions.

An aircraft beacon light 2 according to an exemplary embodiment of the invention may also comprise a light source support 6 having an arcuate shape, for example having a circular or ellipsoidal cross-sectional shape, with the light sources 4 being arranged at the outer periphery of the arcuate shaped light source support 6.

The aircraft beacon light 2 further comprises a light detection sensor 10. The light detection sensor 10 is arranged on the ground plate 8 in a position in which it is surrounded by the annular arrangement of light sources 4. The light detection sensor 10 may be, but not necessarily needs to be, arranged at the center of the annular arrangement of light sources 4.

Optionally, the aircraft beacon light 2 may additionally comprise an ambient light sensor 30, which is configured for detecting ambient light. The additional ambient light sensor 30 may be arranged inside or outside the annular arrangement of light sources 4.

The ground plate 8 is supported by a base 14, configured to be mounted to the exterior of the aircraft 100, 200, which is not depicted in FIGS. 3 and 4.

The aircraft beacon light 2 also comprises a light transmissive cover 12, supported by the base 14 and covering the light detection sensor 10 and the annular arrangement of light sources 4.

At least one reflective portion 16 is arranged on the inside of the light transmissive cover 12, in particular arranged opposite the ground plate 8 and facing the light sources 4 and the light detection sensor 10.

In the orientation depicted in FIG. 3, which corresponds to an orientation in which the aircraft beacon light 2 would be mounted to a top portion of an aircraft 100, 200, the at least one reflective portion 16 is arranged above the light sources 4 and the light detection sensor 10. In a configuration, in which the aircraft beacon light 2 is mounted in an upside-down orientation to a bottom portion of the aircraft 100, 200, the at least one reflective portion 16 would be arranged below the light sources 4 and the light detection sensor 10.

The at least one reflective portion 16 is configured for reflecting light emitted by the light sources 4 onto the light detection sensor 10. As a result, the light detection sensor 10 provides sensor measurement outputs, correlating with the light emitted by the light sources 4.

The reflective portion 16 may have a rotational symmetry with respect to a vertical axis A, extending perpendicular to the ground plate 8 and to the base 14. In particular embodiments, in which the light sources are arranged in a polygonal configuration, the reflective portion 16 may have a corresponding polygonal symmetry.

In the embodiment depicted in FIG. 3, the reflective portion 16 comprises a central planar reflective portion 16$a$ and a curved reflective portion 16$b$ formed at the outer periphery of the planar reflective portion 16$a$.

The curved reflective portion 16$b$ may extend from a vertical line V, extending parallel to the vertical axis A through the light sources 4, to an angle $\alpha$ in the range of 5° to 25°, particularly to an angle $\alpha$ in the range of 10° to 20°, more particularly to an angle $\alpha$ of 15°, with respect to the vertical line V, when measured from the light sources 4. The angle $\alpha$ extends laterally outwards from the vertical line V.

Optionally, the curved reflective portion 16$b$ may have an ellipsoidal shape.

The light sources 4 and the light detection sensor 10 may by arranged so that the curved reflective portion 16$b$ collimates light, emitted by the light sources 4, towards the position of the light detection sensor 10.

In the embodiment depicted in FIG. 3, the reflective portion 16 is provided inside the light transmissive cover 12, so that it is protected by the light transmissive cover 12 from adverse exterior influences, such as water, moisture, dirt, dust and mechanical impact.

In the embodiment depicted in FIG. 3, the at least one reflective portion 16 is provided as a separate component supported by the light transmissive cover 12.

In an alternative configuration, which is not explicitly shown in the figures, the at least one reflective portion 16 may be supported by an additional support structure, which is provided separately form the light transmissive cover 12. The side of the at least one reflective portion 16, facing the light sources 4 and the light detection sensor 10, may be covered with a light reflective coating or paint.

In yet another configuration, which is not explicitly shown in the figures, the at least one reflective portion 16 may be formed integrally with the light transmissive cover 12. The at least one reflective portion 16, for example, may be provided as a light reflective coating or paint, which is applied to or integrated with the light transmissive cover 12.

The at least one reflective portion 16 may include a specular reflecting portion and/or a diffusely reflecting portion. A diffusely reflecting portion may be provided by a bright paint, in particular a white paint, applied to the at least one reflective portion 16 and/or the light transmissive cover 12.

The aircraft beacon light 2 further comprises a controller 20. The controller 20 is configured for controlling the operation of the light sources 4 and for evaluating the sensor measurement outputs, provided by the light detection sensor 10.

In an aircraft beacon light 2 according to an exemplary embodiment of the invention, the controller 20 is in particular configured for cyclically selecting one subset 51-58 of light sources 4 after the other and for modifying the length of at least one of the beacon light flashes 71-74 emitted by the light sources 4 of the selected subset 51-58 (cf. FIGS. 5 and 6) and/or modifying the lengths of the beacon light flashes 71-74 emitted by the light sources 4 of the non-selected subset(s) 51-58, so that the length of at least one beacon light flash 71-74 emitted by the light sources 4 of the selected subset 51-58 exceeds the lengths of the beacon light flashes 71-74 emitted by the light sources 4 of the non-selected subset(s) 51-58 by a predetermined extension time period T12, T22, T32, T42 and only the light sources 4 of the selected subset 51-58 are active during said extension time periods T12, T22, T32, T42.

Modifying the length of at least one of the beacon light flashes 71-74 may include extending the length of at least one of the light flashes 71-74, emitted by the light sources 4 of the selected subset 51-58, and/or shortening the lengths of the beacon light flashes 71-74, emitted by the light sources of the non-selected subsets 51-58 of light sources 4.

The controller 20 is further configured for determining a health status of the aircraft beacon light 2 by evaluating the sensor measurement outputs, provided by the light detection sensor 10 during said extension time periods T12, T22, T32, T42.

Figure 5:
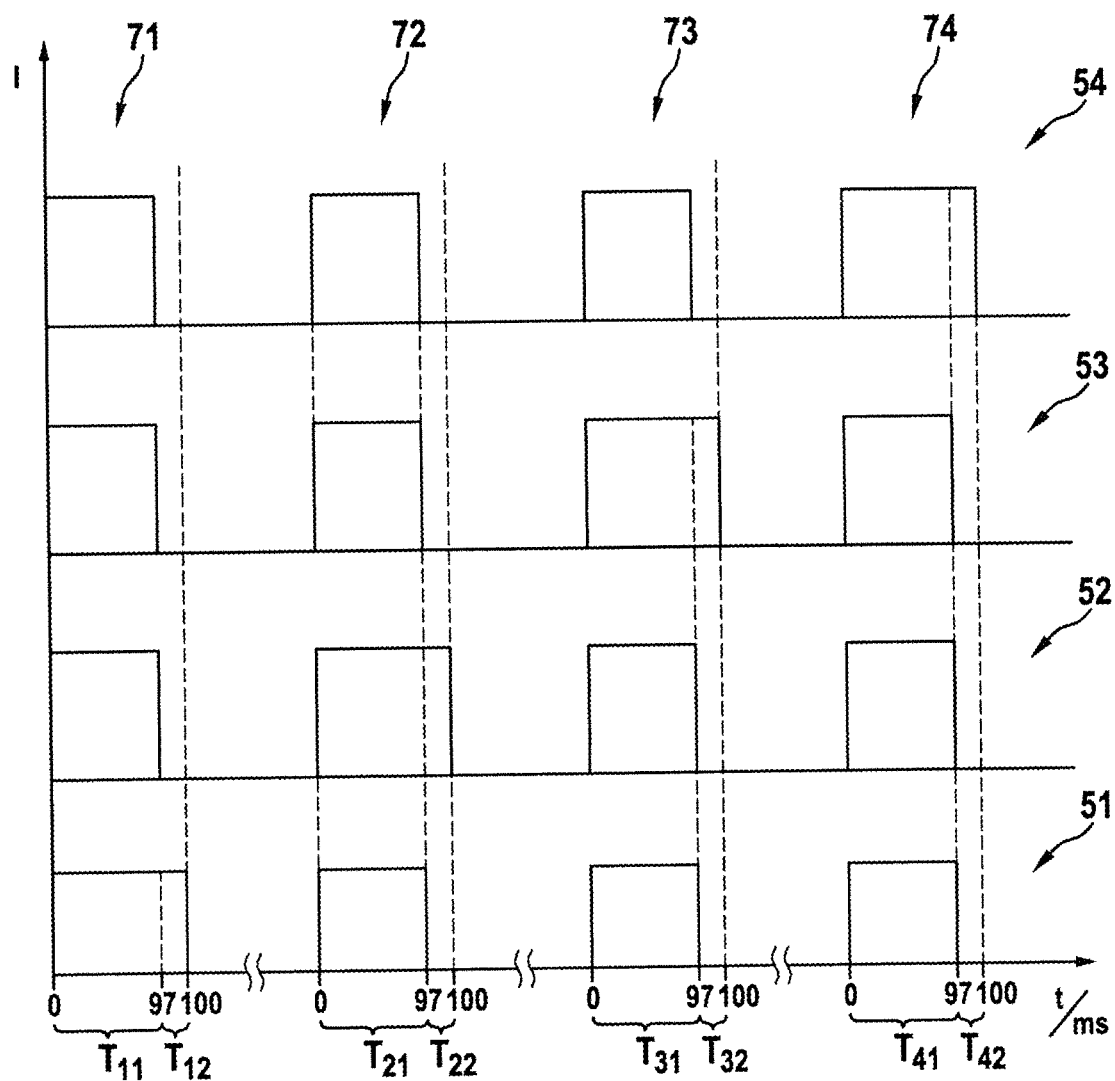
FIG. 5 depicts diagrams schematically illustrating the operation of an aircraft beacon light according to an exemplary embodiment of the invention.

The diagrams shown in FIG. 5 schematically illustrate the operation of the light sources 4 according to an exemplary embodiment of the invention.

In the diagrams shown in FIG. 5, the time t is plotted on the horizontal axis, and the current I flowing through the light sources 4 of each subset of light sources 4 is plotted on the vertical axis.

For clarity, only four subsets 51-54 of light sources 4 and only four light flashes 71-74 are illustrated in FIG. 5. The skilled person may easily extrapolate the information provided by FIG. 5 to further light flashes and to additional subsets of light sources 4.

At the beginning of each light flash 71-74, all light sources 4 of the aircraft beacon light 2 are simultaneously activated and operated during a first time period T11, T21, T31, T41, e.g. during a first time period T11, T21, T31, T41 of approximately 97 ms.

At the end of the first time period T11, T21, T31, T41, the light sources 4 of all but a selected single subset 51-54 of light sources 4 are deactivated, and the light sources 4 of the selected single subset 51-54 of light sources 4 are continued to be operated for an additional second time period T12, T22, T32, T42, which corresponds to the previously mentioned extension time period T12, T22, T32, T42.

The second time period T12, T22, T32, T42, for example, may have a length of 3 ms. The selected subset 51-54 of light sources 4, which are operated for the additional second time period T12, T22, T32, T42, is cyclically changed after every light flash 71-74. In other words, another subset 51-54 is selected after every light flash 71-74.

In an alternative configuration, a new subset 51-54 may be selected not after every light flash 71-74, but after every n-th light flash 71-74, with n being a natural number larger than 1.

As a result, over time, every subset 51-58 of light sources 4 is activated for the additional extension time period at some point.

In the exemplary configuration depicted in FIG. 5, the operation time of the light sources 4 of the first subset 51 is extended for the first light flash 71, the operation time of the light sources 4 of the second subset 52 is extended for the second light flash 72, the operation time of the light sources 4 of the third subset 53 is extended for the third light flash 73, and the operation time of the light sources 4 of the fourth subset 54 is extended for the fourth light flash 74.

The previously mentioned specific values for the first time periods T11, T21, T31, T41 of 97 ms and of 3 ms for the second time periods of T12, T22, T32, T42 are only exemplary, and the light sources 4 may be activated for shorter or longer time periods. The first time periods T11, T21, T31, T41 may in particular be selected from a range of between 90 ms and 110 ms, in particular from a range of between 95 ms and 100 ms; and the second time periods of T12, T22, T32, T42 may be selected from a range of between 1 ms and 10 ms, in particular from a range of between 1 ms and 5 ms, respectively.

Figure 6:
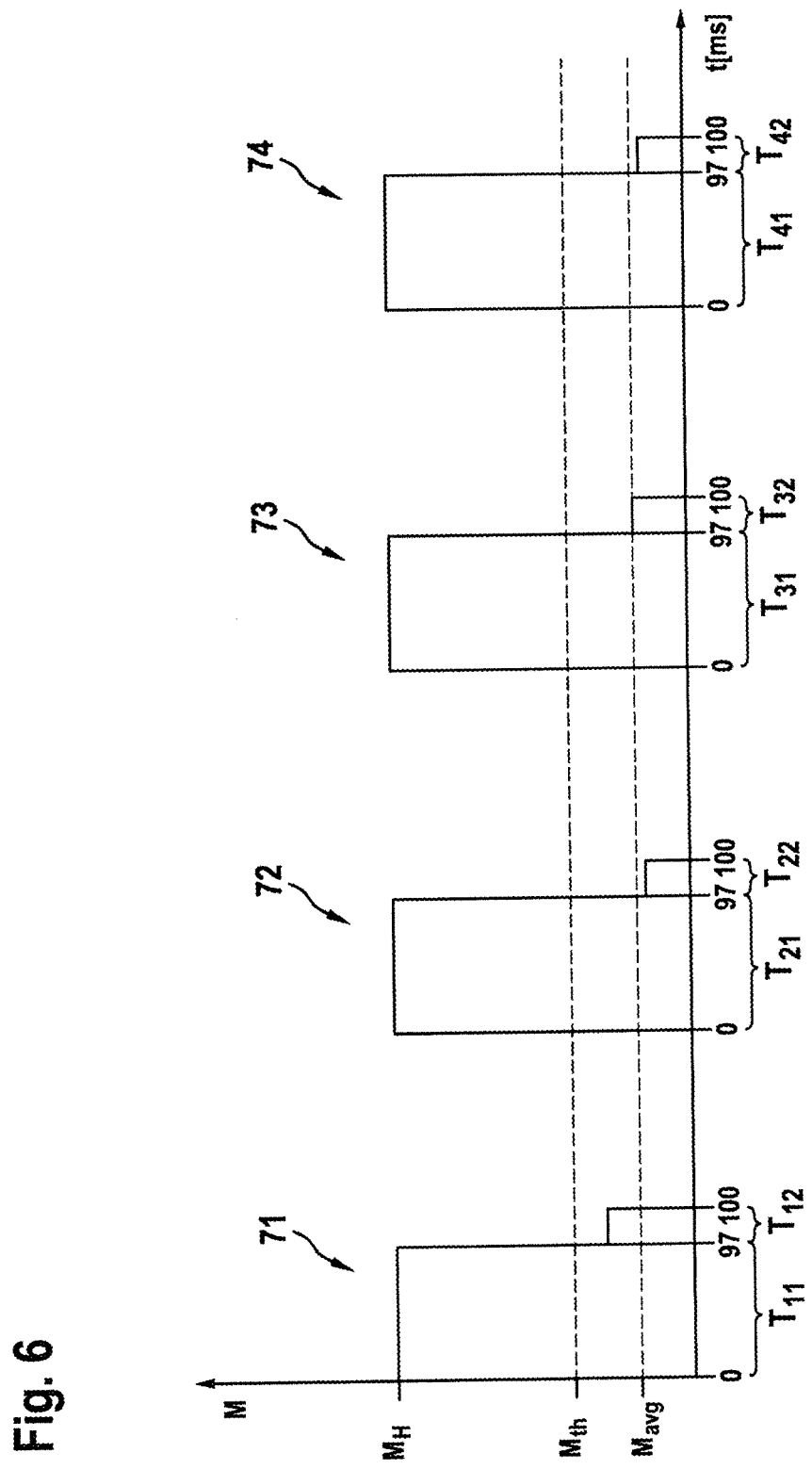
FIG. 6 depicts a diagram illustrating exemplary sensor measurement outputs as a function of time.

FIG. 6 depicts a diagram illustrating exemplary sensor measurement outputs, provided by the light detection sensor 10. The sensor measurement outputs M, which correlate to the intensity of light detected by the light detection sensor 10, are plotted on the vertical axis, and the time t is plotted on the horizontal axis.

During the first time periods T11, T21, T31, T41 all light sources 4 are activated, as it has been described with reference to FIG. 5. As a result, the light detection sensor 10 provides a high sensor measurement output MEI, which is identical for all first time periods T11, T21, T31, T41.

During the second time periods T12, T22, T32, T42, following the respective first time periods T11, T21, T31, T41, only a respective single subset 51-58 of the light sources 4 is activated, as it has been described before with reference to FIG. 5.

In consequence, the sensor measurement outputs M, provided by the light detection sensor 10 during the second time periods T12, T22, T32, T42, are smaller than the high sensor measurement output MH, provided during the first time periods T11, T21, T31, T41.

Further, the sensor measurement outputs M, provided by the light detection sensor 10 during the second time periods T12, T22, T32, T42, are in general not identical.

For example, different erosion levels of different portions of the light transmissive cover 12, facing into different spatial directions, may cause the sensor measurement outputs, provided by light detection sensor 10 during the second time periods T12, T22, T32, T42, to be lower or higher than an average sensor measurement output Mavg.

In the example depicted in FIG. 6, the first light flash 71 is emitted by the light sources 4 of the first subset 51 of light sources 4, which are directed forward (cf. FIG. 4).

Due to mechanical impact of dust and dirt during flight, the front side of the light transmissive cover 12, facing into the direction of flight FD (see FIGS. 3 and 4), is most prone to erosion. Erosion of the light transmissive cover 12 causes a portion of the light, emitted by the forward directed light sources 4, to be diffusely reflected by the light transmissive cover 12. This prevents the reflected portion of light from passing the light transmissive cover 12, resulting in a decrease of the amount of light emitted by the aircraft beacon light 2 and in an increased illumination of the light detection sensor 10.

In consequence, the sensor measurement output, provided by the light detection sensor 10 during the second time period T12 of the first light flash 71, is higher than an average sensor measurement output Mavg, as it is depicted in FIG. 6.

A slow increase of the sensor measurement outputs, which are provided while the forward directed light sources 4 are activated, indicates erosion of the light transmissive cover 12. Thus, the controller 20 may be configured for issuing an alarm signal, indicating that the light transmissive cover 12 needs to be replaced, when the sensor measurement outputs, which are provided while the forward directed light sources 4 are activated, permanently exceed a predefined threshold Mth.

Since a decrease of the intensity of light, emitted by the light sources 4 due to aging of the light sources 4, may at least partially be compensated by an increased reflection of the light transmissive cover 12 caused by erosion, the mentioned increase of sensor measurement outputs due to erosion of the light transmissive cover 12 may prevent the controller 20 from reliably detecting aging of the light sources 4.

In consequence, only sensor measurement outputs provided during the operation of light sources 4 not facing into the forward direction may be used for detecting aging of the light sources 4.

Cyclically extending the length of at least one of the beacon light flashes, emitted by the light sources 4 of the selected subset 51-58, and/or shortening the lengths of the beacon light flashes 71-74, emitted by the light sources of the non-selected subsets 51-58, for predetermined extension time periods T12, T22, T32, T42 and evaluating the sensor measurement outputs, provided by the light detection sensor 10 during the predetermined extension time periods T12, T22, T32, T42, allows for the controller 20 to individually evaluate the light output provided by the different subsets 51-58 of light sources 4.

As a result, damage or aging of the light sources 4 may be detected individually for each subset 51-58 of light sources 4 with only a single light detection sensor 10.

Individually evaluating the light output provided by the different subsets 51-58 of light sources 4 may allow for detecting and localizing erosion of the light transmissive cover 12. It further may allow for distinguishing between deterioration of the light output provided by the aircraft beacon light 2 caused by damage or aging of the light sources 4 and deterioration of the light output caused by erosion of the light transmissive cover 12.

Details of the electric configuration of an aircraft beacon light 2 according to an exemplary embodiment of the invention is described in the following with reference to FIG. 7.

Figure 7:
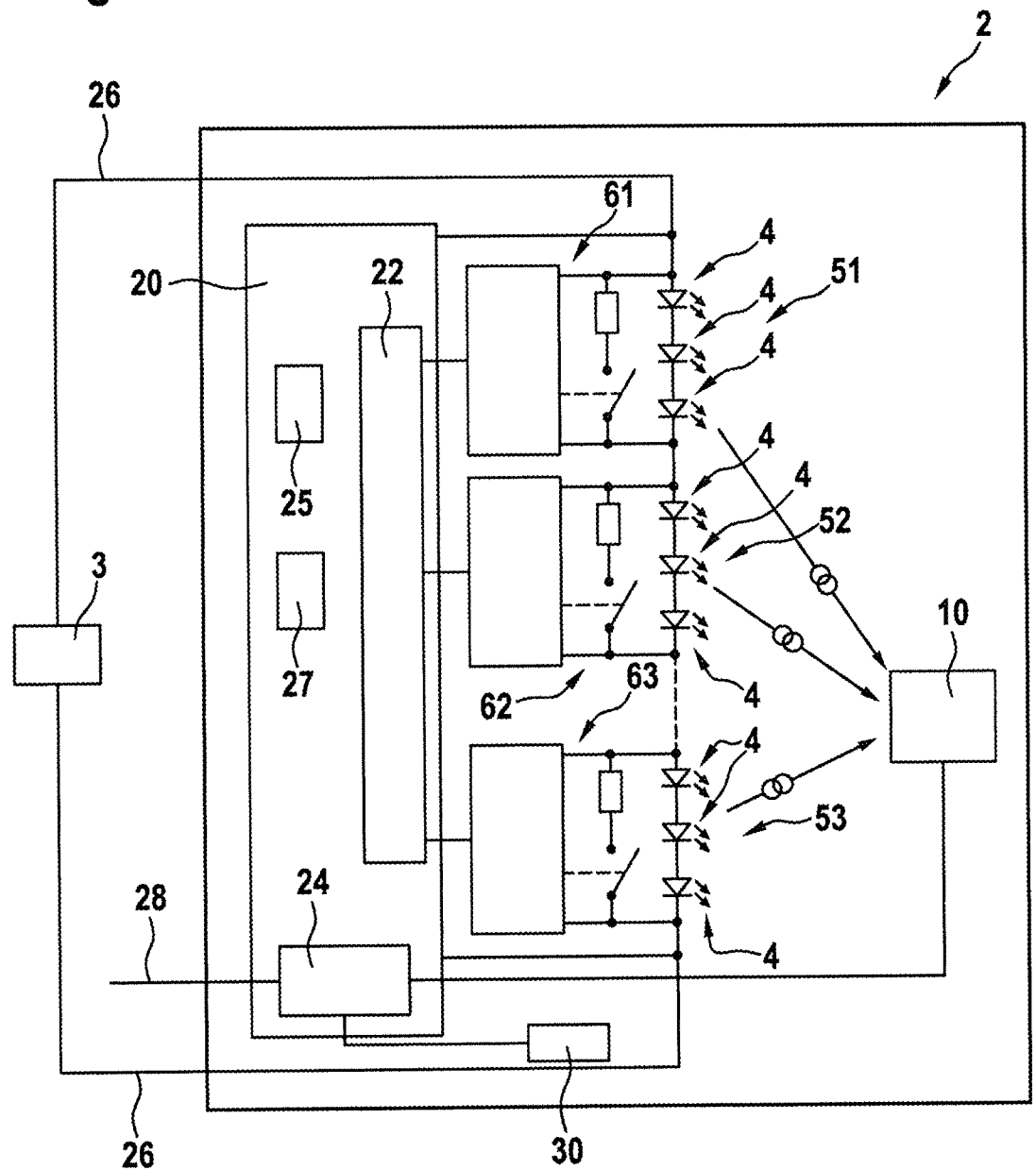
FIG. 7 depicts a schematic block-diagram of an aircraft beacon light according to an exemplary embodiment of the invention.

FIG. 7 depicts a schematic block-diagram of an aircraft beacon light 2 according to an exemplary embodiment of the invention.

The aircraft beacon light 2 depicted in FIG. 7 comprises two power lines 26, which are electrically connected to the controller 20 for receiving electrical power from an aircraft power supply 3 for operating the light sources 4. The aircraft power supply 3 may in particular periodically supply electric power pulses to the aircraft beacon light 2, for example electric power pulses having lengths of approximately 100 ms, for operating the aircraft beacon light 2 in a flash light mode.

The controller 20 comprises a cyclic delay timer 22 and a plurality of bypass circuits 61, 62, 63. Each bypass circuit 61, 62, 63 is associated with one of the subsets 51, 52, 53 of light sources 4 and configured for selectively bypassing the light sources 4 of the associated subset 51, 52, 53, respectively.

For clarity, only three subsets 51, 52, 53 of light sources 4 and three bypass circuits 61, 62, 63 are depicted in FIG. 7. The skilled person can extrapolate the information provided by FIG. 7 to aircraft beacon lights 2 comprising more than three subsets 51, 52, 53 of light sources 4 and a corresponding number of bypass circuits 61, 62, 63. The aircraft beacon light 2 may for example comprise eight subsets of light sources, as described above, and eight bypass circuits or may comprise a smaller or lager number of subsets of light sources and bypass circuits.

When the aircraft beacon light 2 according to an exemplary embodiment of the invention is operated, the cyclic delay timer 22 cyclically selects one of the bypass circuits 61, 62, 63.

At the end of the predetermined first time period T11, T21, T31, which is shorter than the length of the electric power pulses provided by the aircraft power supply 3, the cyclic delay timer 22 activates all bypass circuits except for the selected bypass circuit. As a result, the light sources 4 of all subsets of light sources 4, expect for the light sources 4 associated with the selected bypass circuit, are bypassed and thereby deactivated, so that only the light sources 4 associated with the selected bypass circuit are continued to be operated, as it is illustrated in the diagrams shown in FIG. 5.

A portion of the light emitted by the still activated light sources 4 is reflected by the reflective portion 16 and/or by the light transmissive cover 12 (see FIG. 3). The reflected portion of light is detected by the light detection sensor 10 and a corresponding sensor measurement output is transmitted from the light detection sensor 10 to an evaluation logic 24.

The evaluation logic 24 is configured for evaluating the received sensor measurement output and for providing a resulting evaluation output, indicating aging of the light sources 4 and/or erosion of the light transmissive cover 12 at an evaluation output line 28.

The cyclic delay timer 22 and the evaluation logic 24 may be provided as dedicated electronic circuits within the controller 20. Alternatively, they may be provided a separate electronic circuits separately from the controller 20.

The controller 20 may also comprise at least one microprocessor 25, and the functionalities of the controller 20, in particular the functionalities of the cyclic delay timer 22 and/or of the evaluation logic 24, may be at least partly implemented as software programs running on said at least one microprocessor 25.

The controller 20 may further comprise a memory 27, which allows for storing the sensor measurement outputs and evaluating changes of the sensor measurement outputs over time. Evaluating changes of the sensor measurement outputs over time may allow for detecting erosion of the light transmissive cover 12 and/or detecting aging of the light sources 4 from a gradual change of the sensor measurement outputs, provided by the light detection sensor 10 over time.

Ambient light detected by the light detection sensor 10 may disturb the evaluation of the sensor measurement output provided by the light detection sensor 10 and cause false or unreliable evaluation results.

In order to avoid false and unreliable measurement results caused by ambient light, the evaluation logic 24 may be configured for evaluating the sensor measurement outputs provided by the light detection sensor 10 only if the intensity of detected ambient light is below a predefined ambient light threshold.

Ambient light may be detected by the light detection sensor 10 during time periods in which all light sources 4 are deactivated. Alternatively, the aircraft beacon light 2 may comprise an additional ambient light sensor 30 (see FIGS. 3 and 4), which is configured for detecting ambient light.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft beacon light with integrated health monitoring, comprising:

an annular arrangement of light sources, configured for repeatedly emitting beacon light flashes;
a light detection sensor surrounded by the annular arrangement of light sources; and
at least one reflective portion arranged to reflect light, emitted by the annular arrangement of light sources, onto the light detection sensor.

2. The aircraft beacon light as claimed in claim 1, further comprising a light transmissive cover, covering the annular arrangement of light sources and the light detection sensor;
wherein the at least one reflective portion is provided inside the light transmissive cover; or
wherein the at least one reflective portion is supported by and/or formed integrally with the light transmissive cover, wherein the at least one reflective portion comprises in particular a reflective coating on the light transmissive cover.

3. The aircraft beacon light as claimed in claim 1,
wherein the at least one reflective portion includes a specular reflecting portion and/or a diffusely reflecting portion; and
wherein the at least one reflective portion has a substantially planar portion and/or a curved portion, in particular a curved portion having an ellipsoidal shape.

4. The aircraft beacon light as claimed in claim 1, wherein the light sources are arranged in a circular, ellipsoidal, rectangular, hexagonal or octagonal configuration.

5. The aircraft beacon light as claimed in claim 1,
wherein the annular arrangement of light sources comprises at least two subsets of light sources, each subset comprising at least one light source, respectively,
and wherein the aircraft beacon light further comprises:
a controller, which is configured for:
selecting one subset of light sources after the other from the at least two subsets of light sources and modifying the length of at least one of the beacon light flashes emitted by the selected subset of light sources and/or modifying the lengths of the beacon light flashes emitted by the non-selected subset(s) of light sources, so that the length of the at least one beacon light flash emitted by the selected subset of light sources exceeds the lengths of the beacon light flashes emitted by the non-selected subset(s) of light sources by a predetermined extension time period ($T_{12}$, $T_{22}$, $T_{32}$, $T_{42}$) and only the selected subset of light sources is active during the predetermined extension time period ($T_{12}$, $T_{22}$, $T_{32}$, $T_{42}$); and
evaluating sensor measurement outputs, provided by the light detection sensor during the predetermined extension time periods ($T_{12}$, $T_{22}$, $T_{32}$, $T_{42}$), for determining a health status of the aircraft beacon light.

6. The aircraft beacon light as claimed in claim 5, wherein determining the health status of the aircraft beacon light includes detecting erosion of the light transmissive cover and/or detecting aging of the light sources, wherein determining the health status of the aircraft beacon light includes in particular distinguishing between erosion of the light transmissive cover and aging of the light sources.

7. The aircraft beacon light as claimed in claim 6, wherein the at least two subsets of light sources include a first subset of light sources, providing forward light emission, and a second subset of light sources, providing non-forward light emission.

8. The aircraft beacon light as claimed in claim 7, wherein the second subset of light sources provides rearward light emission, wherein the at least two subsets of light sources include in particular at least one further subset of light sources, providing lateral light emission.

9. The aircraft beacon light as claimed in claim 5,
wherein evaluating the sensor measurement outputs includes at least one of:
comparing the sensor measurement outputs caused by light emitted by the at least two different subsets of light sources with each other; and
storing the sensor measurement outputs in a memory and evaluating a change of the sensor measurement outputs over time.

10. The aircraft beacon light as claimed in claim 1, wherein each beacon light flash has a length of between 90 ms and 110 ms, or wherein the predetermined extension time period ($T_{12}$, $T_{22}$, $T_{32}$, $T_{42}$) has a length of between 1 ms and 8 ms.

11. The aircraft beacon light as claimed in claim 1, wherein the aircraft beacon light includes at least two switchable bypass circuits, wherein each switchable bypass circuit allows for individually bypassing one of the at least two subsets of light sources, respectively.

12. An aircraft comprising:
an aircraft beacon light as claimed in claim 1;
wherein the aircraft beacon light is mounted to a top portion of the aircraft or to a bottom portion of the aircraft.

13. A method of determining a health status of an aircraft beacon light that includes an annular arrangement of light sources and a light detection sensor surrounded by the annular arrangement of light sources, wherein the method comprises:
repeatedly emitting beacon light flashes from the annular arrangement of light sources;
generating sensor measurement outputs with the light detection sensor, the sensor measurement outputs being indicative of light emitted by the annular arrangement of light sources and reflected onto the light detection sensor by at least one reflective portion; and
determining a health status of the aircraft beacon light from the sensor measurement outputs.

14. The method of determining a health status of an aircraft beacon light in accordance with claim 13,
wherein the annular arrangement of light sources comprises at least two subsets of light sources, each subset comprising at least one light source, respectively, and the method further comprises:
selecting one subset of light sources after the other from the at least two subsets of light sources and modifying the length of at least one of the beacon light flashes emitted by the selected subset of light sources and/or modifying the lengths of the beacon light flashes emitted by the non-selected subset(s) of light sources, so that the length of the at least one beacon light flash emitted by the selected subset of light sources exceeds the lengths of the beacon light flashes emitted by the non-selected subset(s) of light sources by a predetermined extension time period ($T_{12}$, $T_{22}$, $T_{32}$, $T_{42}$) and only the selected subset of light sources is active during the predetermined extension time period ($T_{12}$, $T_{22}$, $T_{32}$, $T_{42}$); and
evaluating the sensor measurement outputs of the light detection sensor during the predetermined extension time periods ($T_{12}$, $T_{22}$, $T_{32}$, $T_{42}$) for determining the health status of the aircraft beacon light.

15. The method of operating an aircraft beacon light in accordance with claim 13, wherein the method further includes at least one of the following:

determining erosion of a light transmissive cover covering the light sources;
detecting aging of the light sources;
distinguishing between erosion of the light transmissive cover and aging of the light sources;
comparing the sensor measurement outputs caused by light emitted by at least two different subsets of light source with each other;
storing the sensor measurement outputs in a memory and evaluating a change of the sensor measurement outputs over time; and
detecting an intensity of ambient light and evaluating the sensor measurement outputs only when the detected intensity of ambient light does not exceed a predetermined threshold.

* * * * *